(12) United States Patent
Tokuda et al.

(10) Patent No.: US 10,371,271 B2
(45) Date of Patent: Aug. 6, 2019

(54) FLUID CONTROLLER WITH DIAPHRAGM

(71) Applicant: FUJIKIN INCORPORATED, Osaka-shi (JP)

(72) Inventors: Ichiro Tokuda, Osaka (JP); Akihiro Harada, Osaka (JP); Hidenori Kiso, Osaka (JP); Tomohiro Nakata, Osaka (JP); Tsutomu Shinohara, Osaka (JP); Michio Yamaji, Osaka (JP)

(73) Assignee: FUJIKIN INCORPORATED, Osaka-shi (JP)

( * ) Notice: Subject to any disclaimer, the term of this patent is extended or adjusted under 35 U.S.C. 154(b) by 0 days.

(21) Appl. No.: 15/300,401

(22) PCT Filed: Feb. 5, 2016

(86) PCT No.: PCT/JP2016/053478
§ 371 (c)(1),
(2) Date: Sep. 29, 2016

(87) PCT Pub. No.: WO2016/136427
PCT Pub. Date: Sep. 1, 2016

(65) Prior Publication Data
US 2017/0184206 A1 Jun. 29, 2017

(30) Foreign Application Priority Data
Feb. 27, 2015 (JP) .................... 2015-039181

(51) Int. Cl.
*F16K 7/17* (2006.01)
*F16K 31/122* (2006.01)

(52) U.S. Cl.
CPC .............. *F16K 7/17* (2013.01); *F16K 31/122* (2013.01); *F16K 31/1221* (2013.01); *F16K 31/1225* (2013.01)

(58) Field of Classification Search
None
See application file for complete search history.

(56) References Cited

U.S. PATENT DOCUMENTS

| | | | | |
|---|---|---|---|---|
| 5,112,027 A | * | 5/1992 | Hanyu | ............. F16K 7/16 251/274 |
| 5,413,311 A | * | 5/1995 | Arstein | ............. F16K 7/16 251/229 |

(Continued)

FOREIGN PATENT DOCUMENTS

| | | |
|---|---|---|
| JP | 3-79875 A | 4/1991 |
| JP | 2001-021052 A | 1/2001 |

(Continued)

OTHER PUBLICATIONS

International Search Report dated Apr. 26, 2016, issued for PCT/JP2016/053478.

(Continued)

*Primary Examiner* — Robert K Arundale
*Assistant Examiner* — Daphne M Barry
(74) *Attorney, Agent, or Firm* — Locke Lord LLP

(57) ABSTRACT

A fluid controller that reduces an increase in cost by additional components or additional processes for setting means, and solves the problem that a set value of an upward movable amount of a stem changes is provided. An upper surface of an outer peripheral edge portion of a diaphragm holder 7 and a lower surface of an inner peripheral edge portion of a holder adapter 15 are formed so as to oppose to each other with a first gap A interposed therebetween. By setting the first gap A to a predetermined value, an upward movable amount of the diaphragm holder 7 is set.

9 Claims, 2 Drawing Sheets

(56) References Cited

U.S. PATENT DOCUMENTS

| | | | | |
|---|---|---|---|---|
| 5,439,197 A | * | 8/1995 | Itoi | F16K 31/506 |
| | | | | 251/104 |
| 7,370,664 B2 | * | 5/2008 | Glime | F16K 1/34 |
| | | | | 137/375 |
| 7,802,771 B2 | * | 9/2010 | Tsubota | F16K 31/1221 |
| | | | | 251/331 |
| 2005/0269534 A1 | | 12/2005 | Tanikawa et al. | |
| 2010/0090151 A1 | * | 4/2010 | Tanikawa | F16J 3/02 |
| | | | | 251/331 |

FOREIGN PATENT DOCUMENTS

| | | |
|---|---|---|
| JP | 2003-014155 A | 1/2003 |
| JP | 2007-64333 A | 3/2007 |
| KR | 10-2005-0057037 A | 6/2005 |

OTHER PUBLICATIONS

Official Letter dated Feb. 20, 2018, issued for the Korean patent application number is 10-2016-7027096 and English translation thereof.

* cited by examiner

FLUID CONTROLLER WITH DIAPHRAGM

TECHNICAL FIELD

The present invention relates to a fluid controller, and specifically to a fluid controller suitable to be used for adjusting a flow rate by restricting an upward and downward movable amount of a stem in association with opening and closing operations.

BACKGROUND ART

As a known fluid controller suitable to be used for adjusting a flow rate by restricting an upward and downward movable amount of a stem in association with opening and closing operations, there is a configuration including: a body provided with a fluid passage; a casing provided above the body; a diaphragm configured to open and close the fluid passage; a stem configured to move the diaphragm to an open or close direction by moving upward or downward; a diaphragm holder fixed to a lower end portion of the stem; a holder adapter disposed radially outside the diaphragm holder and fixed to the body and configured to hold an outer peripheral edge portion of the diaphragm; a piston configured to move upward and downward integrally with the stem; drive means configured to move the piston upward and downward; and setting means configured to set the upward movable amount of the stem in association with opening and closing operations (PTL 1).

In the case of PTL 1, the setting means is configured in such a manner that a female screw portion of a handle and a male screw portion provided on the casing are engaged with each other and the upward and downward movable amount of the stem in association with opening and closing operations is adjusted by adjusting the position of a stopper by rotating the handle.

CITED REFERENCE

Patent Literature

PTL 1: JP-A-2003-14155

SUMMARY OF INVENTION

Problem to be Solved by Invention

The fluid controller of PTL 1 described above has a problem in that additional components and additional processes are required for the setting means and thus the cost increase may result.

In addition, since the handle can be operated from the outside, there is another problem such that a set value may be changed due to an erroneous operation of an operator or that the set value may be changed when an object or a hand hits.

It is an object of the present invention to provide a fluid controller that reduces an increase in cost by additional components or additional processes for setting means, and solves the problem that a set value of the upward movable amount of a stem changes.

Means for Solving the Problem

A fluid controller of the present invention includes: a body provided with a fluid passage; a casing provided above the body; a diaphragm configured to open and close the fluid passage; a stem configured to move the diaphragm to an open or close direction by moving upward or downward; a diaphragm holder fixed to a lower end portion of the stem; a holder adapter disposed radially outside the diaphragm holder and fixed to the body and configured to hold an outer peripheral edge portion of the diaphragm; a piston configured to move upward and downward integrally with the stem; and drive means configured to move the piston upward and downward, wherein a gap between an upper surface of an outer peripheral edge portion of the diaphragm holder and a lower surface of an inner peripheral edge portion of the holder adapter is set as a first gap, and an upward movable amount of the diaphragm holder is set by the first gap.

In the fluid controller of the related art, a radial gap is provided between the outer peripheral edge portion of the diaphragm holder and the inner peripheral edge portion of the holder adapter, and the upper surface of the outer peripheral edge portion of the diaphragm holder and the lower surface of the inner peripheral edge portion of the holder adapter do not oppose each other. In contrast, in this fluid controller, the upper surface of the outer peripheral edge portion of the diaphragm holder and the lower surface of the inner peripheral edge portion of the holder adapter oppose each other with the first gap interposed therebetween. Therefore, when the stem and the diaphragm holder fixed thereto move upward by a predetermined amount, the upper surface of the outer peripheral edge portion of the diaphragm holder and the lower surface of the inner peripheral edge portion of the holder adapter come into abutment with each other (the first gap becomes zero). Accordingly, the further upward movement of the diaphragm holder is prevented, and in association with it, further deformation of the diaphragm held by the diaphragm holder is prevented.

The first gap may be obtained by the diaphragm holder having a predetermined shape, for example. When necessity of changing the upward movable amount of the stem arises, a change to an adequate value is enabled by changing the diaphragm holder.

The shapes of the diaphragm holder and the holder adapter are different from those of the related art. However, screw machining or additional components that used to be required for the setting means of the related art are not necessary, and an increase in cost may be restricted.

Since the diaphragm holder and the holder adapter are stored in the fluid controller (interior of the casing and a bonnet), and are not exposed in the state in which the fluid controller is in use, the change of the set value due to an erroneous operation by an operator or the change of the set value because an object or a hand hits is avoided.

The fluid controller may be a normally-closed type and may be a normally-open type.

Preferably, a second gap for setting a downward movable amount of the stem is formed between a lower surface of a flange portion provided at the lower end portion of the stem and the upper surface of the holder adapter.

In this configuration, setting of a downward movable amount of the stem is achieved.

The second gap may be obtained, for example, by forming the holder adapter to have a predetermined shape.

In this manner, since the downward movable amount of the stem is set by using the stem and the holder adapter, not only the setting of the upward movable amount of the stem, but also the setting of the downward movement amount of the stem is enabled without additional machining other than screw machining and additional components such as a handle or a stopper, and consequently, a new function may be added while restricting an increase in cost.

Preferably, the stem and the piston are integrally formed by being engaged with each other, so that the upward movable amount of the stem set by adjusting an amount of engagement between the stem and the piston may be set to be smaller than the upward movable amount of the stem set by the first gap.

In this configuration, the upward movable amount of the stem may be reduced without changing the diaphragm holder. In addition, even when the diaphragm holder has become damaged, the stem is prevented from moving upward by an amount exceeding the upward movable amount of the stem set by adjusting the amount of engagement between the stem and the piston. In the case where adjustment is not required, an integrated member including the piston and the stem may be used.

Advantageous Effects of Invention

According to the fluid controller of the present invention, since the upward movable amount of the stem is set by using the diaphragm holder and the holder adapter, setting of the upward movable amount of the stem is achieved without additional machining and the additional component such as the handle or the stopper. Consequently, an increase in cost may be restricted. Since the diaphragm holder and the holder adapter are stored in the fluid controller, the change of the set value due to the erroneous operation of the operator or the change of the set value because the object or the hand hits may be avoided.

Figure 1:
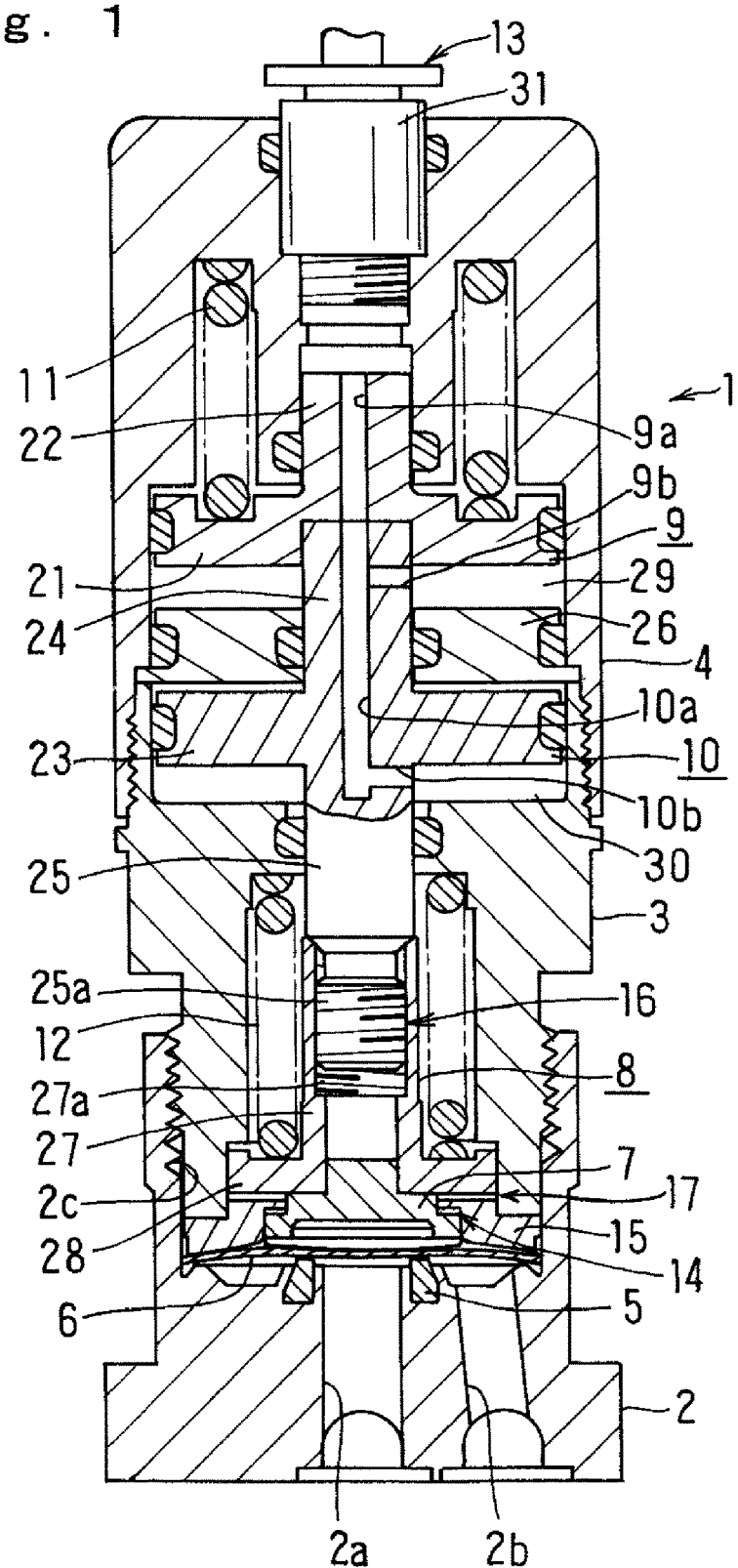
FIG. 1 is a vertical cross-sectional view illustrating an embodiment of a fluid controller of the present invention.

REFERENCE SIGNS LIST (1): fluid controller
(2): body
(2a): fluid inflow passage
(2b): fluid outflow passage
(4): casing
(6): diaphragm
(7): diaphragm holder
(8): stem
(9)(10): piston
(13): drive means
(14): setting means
(15): holder adapter
(28): flange portion
Description of Embodiments An embodiment of the invention will be described below with reference to the drawings. In the following description, expressions upper and lower correspond to upper and lower of the drawings.

Figure 2:
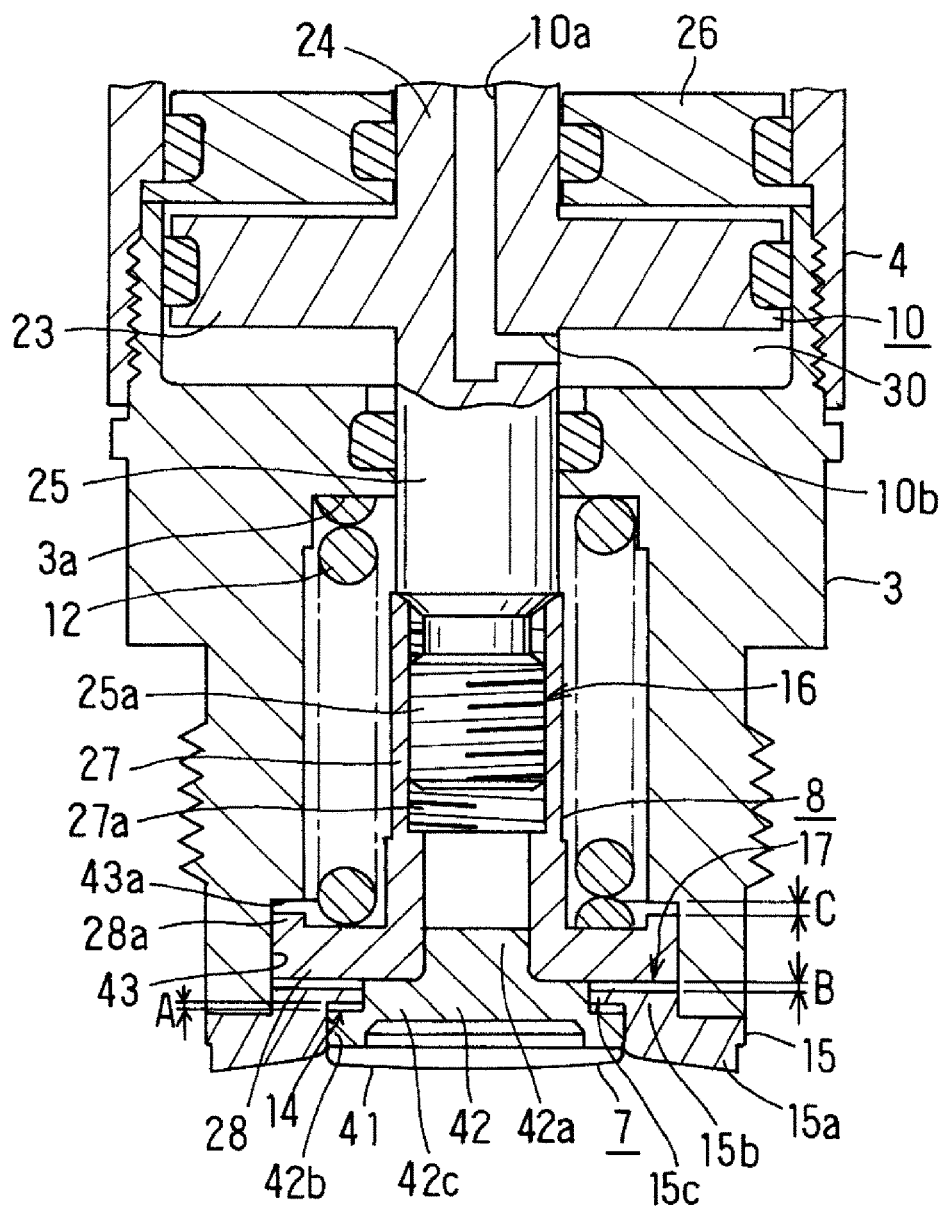
FIG. 2 is an enlarged cross-sectional view of a periphery of setting means, which is a principal portion of FIG. 1.

FIG. 1 and FIG. 2 illustrate an embodiment of a fluid controller of the present invention.

A fluid controller (1) is referred to as a direct-touch type metal diaphragm valve and includes: a body (2) provided with a fluid inflow passage (2a) and a fluid outflow passage (2b); a casing (4) mounted above the body (2) via a bonnet (3); an annular valve seat (5) provided on a peripheral edge of the fluid inflow passage (2a); a metallic diaphragm (6) configured to be pressed against or moved away from the annular valve seat (5) and to open and close the fluid inflow passage (2a); a diaphragm holder (7) configured to press the diaphragm (6) downward; a stem (8) disposed in the casing (4) and configured to move the diaphragm (6) to the open or close direction by moving upward or downward; upper and lower pistons (9) (10); upper and lower compression coil springs (biasing members) (11) (12); drive means (13) configured to drive the upper and lower pistons (9) (10); two setting means (14) (16) configured to set an upward movable amount of the stem; and one setting means (17) configured to set a downward movable amount of the stem.

The diaphragm (6) has a naturally curved spherical shell shape protruding upward. The diaphragm (6) is formed, for example, of a nickel alloy thin plate, and is formed into a spherical shell shape by cutting out into a circular shape and causing a central portion thereof to protrude upward. The diaphragm (6) may be formed of a stainless steel thin plate, or of a laminated member composed of a stainless steel thin plate and a nickel-cobalt alloy thin plate.

A holder adapter (15) is disposed between a lower end surface of the bonnet (3) and a bottom surface of a depression (2c) of the body (2), and an outer peripheral edge portion of the diaphragm (6) is held between the holder adapter (15) and the bottom surface of the depression (2c) of the body (2).

The upper piston (9) includes a disc-shaped piston body (21), and a protruding shaft portion (22) extending upward from an upper surface of a central portion of the piston body (21). The lower piston (10) includes a disc-shaped piston body (23), and upper protruding shaft portion (24) extending upward from an upper surface of a central portion of the piston body (23), and a lower protruding shaft portion (25) extending downward from a lower surface of the central portion of the piston body (23).

A counter plate (26) is fixed to a position of the casing (4) closer to a lower end thereof so as to be positioned between the upper piston (9) and the lower piston (10), whereby movable spaces for the pistons (9) (10) are formed upward and downward of the counter plate (26), respectively.

An upper end portion of the upper protruding shaft portion (24) of the lower piston (10) is fitted into a depression provided on a lower surface of the piston body (21) of the upper piston (9). The upper compression coil spring (11) is provided so as to bias the upper piston (9) downward, whereby the upper and lower pistons (9) (10) move initegrally upward and downward.

The stem (8) is provided with a cylindrical main body (27) provided with a female screw (27a) formed in an inner periphery of an upper portion thereof, and a flange portion (28) provided at a lower end portion of the main body (27).

The lower piston (10) is provided with a male screw (25a) formed at a lower end portion of the lower protruding shaft portion (25) thereof and the stem (8) and the lower piston (10) are movable upward and downward integrally by being engaged with each other.

If the amount of change of the diaphragm (6) when the stem (8) moves upward is large, durability of the diaphragm (6) is lowered. The upward movable amount of the stem (8) has a correlation with a flow rate (Cv value), and thus adjustment of the upward movable amount of the stem is required for obtaining a required Cv value. The setting means (14) (16) (17) are each configured to set a movable amount of the stem (stroke) without using an additional component.

The drive means (13) is configured to cause operation air to act on the respective pistons (9) (10) to move the stem (8) upward, so that an upper operation air introduction chamber (29) and a lower operation air introduction chamber (30)

therefor are formed below the pistons (9) (10), respectively. The drive means (13) also includes a one-touch joint (31) mounted on a top of the casing (4). The upper and lower pistons (9) (10) are provided with axial passages (9a) (10a) and radial passages (9b) (10b) configured to feed the operation air introduced through the one-touch joint (31) to the respective operation air introduction chambers (29) (30), respectively. The pistons (9) (10) receive upward forces respectively by the operation air introduced into the respective operation air introduction chambers (29) (30).

In a state in which the operation air is not introduced into the respective operation air introduction chambers (29) (30), the stem (8) is at a closed position (lower position) due to biasing forces of the compression coil springs (11) (12), and when the operation air is introduced into the respective operation air introduction chambers (29) (30), the stem (8) is moved upward against the urging forces of the compression coil springs (11) (12) and thus the diaphragm holder (7) is moved upward correspondingly, so that an open state in which the diaphragm (6) is deformed so as to protrude upward is achieved.

Referring now to FIG. 2, detailed configuration of the setting means (14) (16) (17) will be described.

The diaphragm holder (7) includes an abutting member (41) formed of PCTFE and in abutment with the diaphragm (6), and a holding member (42) formed of stainless steel and provided with a depression opening downward in which the abutting member (41) is fitted.

The holding member (42) has a disc shape, and includes an upper small diameter portion (42a), a lower large diameter portion (42b) having a diameter larger than the small diameter portion (42a), and an intermediate diameter portion (42c) provided between the small diameter portion (42a) and the large diameter portion (42b) and having an intermediate outer diameter therebetween.

The holding member (42) is fixed with the small diameter portion (42a) inserted into a lower end portion of the main body (27) of the stem (8) and an upper surface of the intermediate diameter portion (42c) abutting against a lower surface of the flange portion (28) of the stem (8).

The lower compression coil spring (12) is received at an upper end thereof by a spring receiving surface (3a) provided on the bonnet (3) and at a lower end thereof by an upper surface of the flange portion (28) of the stem (8). An annular upper protruding portion (28a) having a square cross-section is provided on an outer peripheral edge portion (a portion radially outward of the surface that receives the compression coil spring (12)) on the upper surface of the flange portion (28) of the stem (8).

The lower end portion of the bonnet (3) is provided with an annular depression (43) depressed with respect to an inner peripheral surface located above. The stem (8) is movable upward and downward by an outer peripheral edge portion of the flange portion (28) being guided by a cylindrical peripheral surface of the depression (43) of the bonnet (3). An upper surface of the upper protruding portion (28a) of the flange portion (28) comes into abutment with an upper surface of the depression (43) (a stepped surface formed between the depression (43) and an inner peripheral surface above the depression (43)) (43a), so that the stem (8) is prevented from moving further upward.

The holder adapter (15) includes a radially outside portion (15a) pressed against the lower end surface of the bonnet (3), a radially inside portion (15b) which is not pressed against the lower end surface of the bonnet (3), and an inner peripheral edge portion (15c) thinner than the radially inside portion (15b).

A lower surface of the thin inner peripheral edge portion (15c) of the holder adapter (15) opposes an upper surface of an outer peripheral edge portion of the large diameter portion (42b) of the holding member (42) from above, and a first gap A having a predetermined size may be formed therebetween.

Therefore, when the stem (8) and the diaphragm holder (7) fixed thereto move upward by an amount corresponding to the first gap A, the upper surface of the outer peripheral edge portion of the large diameter portion (42b) of the diaphragm holder (7) and the lower surface of the inner peripheral edge portion (15c) of the holder adapter (15) come into abutment with each other (the first gap A becomes zero). Accordingly, further upward movement of the diaphragm holder (7) is prevented, and in association with it, further deformation of the diaphragm (6) held by the diaphragm (7) holder is prevented.

In this manner, the upper surface of the outer peripheral edge portion of the diaphragm holder (7) and the lower surface of the inner peripheral edge portion of the holder adapter (15) are formed so as to oppose each other with the first gap A interposed therebetween, and the first setting means (14) that sets the upward movable amount of the stem is configured to set the upward movable amount of the stem (8) by setting the first gap A to a predetermined value.

Upper surfaces of the radially inside portion (15b) and the inner peripheral edge portion (15c) of the holder adapter (15) are flush with each other and oppose the lower surface of the flange portion (28) of the stem (8) from below, and a second gap B having a predetermined size is formed therebetween.

Therefore, when the stem (8) and the diaphragm holder (7) move downward by an amount corresponding to the second gap B, the lower surface of the flange portion (28) of the stem (8) comes into abutment with the upper surfaces of the radially inside portion (15b) and the inner peripheral edge portion (15c) of the holder adapter (15). Accordingly, further downward movement of the diaphragm holder (7) is stopped, and thus a downward strong force is not applied to the diaphragm holder (7).

In this manner, the second gap B for setting the downward movable amount of the stem (8) is formed between the lower surface of the flange portion (28) provided on the lower end portion of the stem (8) and the upper surface of the holder adapter (15), and the setting means (17) configured to set the downward movable amount of the stem is configured to set the downward movable amount of the stem (8) by setting the second gap B to a predetermined value.

In the description given thus far, the upper surface of the upper protruding portion (28a) of the flange portion (28) comes into abutment with the upper surface (43a) of the depression (43), and thus the stem (8) is prevented from moving further upward, so that a third gap C formed between the upper surface of the upper protruding portion (28a) of the flange portion (28) of the stem (8) and the upper surface (43a) of the depression (43) may be used as an upper limit value of the allowable upward movable amount of the stem (8). This is the second setting means (16) configured to set the upward movable amount of the stem. In the second setting means (16), a configuration in which the flange portion (28) and the upper surface (43a) of the depression (43) come into abutment with each other directly without provision of the upper protruding portion (28a) is also applicable.

In this embodiment, initially, the gaps are defined to have a relationship of C>A, that is, the first gap A of the first setting means (14) is set the upward movable amount of the stem to be the upper limit value of the upward movable amount of the stem.

Here, in the second setting means (16) configured to set the upward movable amount of the stem, the third gap C may be adjusted by rotating the stem (8) with respect to the lower piston (10) while fixing the lower piston (10).

Therefore, in the case where an upper limit value of the upward movable amount of the stem (8) smaller than the upward movable amount of the stem (8) set by the first gap A is required, it may be changed to a set value different from an initial set value by changing the amount of engagement between the stem (8) and the lower piston (10).

A gap between the upper surface of the lower piston (10) and the lower surface of the counter plate (26) may be used as a stem elevating amount C instead of using the gap between the upper surface of the protruding portions (28a) of the flange portion (28) of the stem (8) and the upper surface (43a) of the depression (43).

Also, the second setting means (16) configured to set the upward movable amount of the stem may be configured to form a male screw on an upper end portion of the stem (8) and form a female screw on a lower end portion of the lower protruding shaft portion (25) of the lower piston (10).

In the description given thus far, since the first setting means (14) configured to set the upward movable amount of the stem A sets the upward movable amount of the stem by using the diaphragm holder (7) and the holder adapter (15), setting of the upward movable amount of the stem without additional machining or additional components such as the handle and the stopper is enabled by the diaphragm holder (7) and the holder adapter (15) having required shapes, so that an increase in cost may be restricted.

Also, the setting means (17) configured to set the downward movable amount of the stem is capable of setting the downward movable amount of the stem without additional machining or additional components such as the handle and the stopper by the radially inside portion (15b) and the inner peripheral edge portion (15c) of the holder adapter (15) having the required shapes, so that a new function may be obtained while restricting an increase in cost.

Also, since the second setting means (16) configured to set the upward movable amount of the stem C also utilizes screw coupling for moving the stem (8) and the lower piston (10) integrally upward and downward, setting of the upward movable amount of the stem C is enabled without additional components or additional machining for the setting means (16).

In addition, since the setting means (14) (16) (17) are in the fluid controller (1), erroneous operation which may become an issue in the fluid controller (1) of the related art configured to set the upward movable amount of the stem by the handle or change of the set value by an object or a hand that hits is prevented.

In the description given thus far, the number of pistons is determined to be two. However, one or plural, that is, two or more pistons may be provided corresponding to the fluid to be controlled or pressure.

Although an air-driven type direct touch type metal diaphragm valve is exemplified as the fluid controller (1), the above-described setting means (14) (16) (17) may be applied not only thereto, but also to various valves that need adjustment of the upward movable amount of the stem. At the time of application, it is not necessary to provide all of the setting means (14) (16) (17), but provision of one or two of the setting means (14) (16) (17) is also applicable.

INDUSTRIAL APPLICABILITY

According to the present invention, in the fluid controller used suitable for adjusting the flow rate by restricting the upward and downward movable amount of the stem in association with the opening and closing operation, an increase in cost may be restricted and hence the set value is prevented from being erroneously changed. Therefore, contribution to improvement of performance of the fluid controller used in an application for adjusting the flow rate is achieved.

The invention claimed is:

1. A fluid controller comprising:
a body provided with a fluid passage;
a casing mounted above the body via a bonnet;
a diaphragm configured to open and close the fluid passage;
a stem configured to move the diaphragm to an open or close direction by moving upward or downward, the stem having a flange portion at a lower end portion of the stem which extends radially from an upper surface of a diaphragm holder to the bonnet;
the diaphragm holder fixed to the lower end portion of the stem;
a holder adapter disposed radially outside the diaphragm holder and fixed to the body, and configured to hold an outer peripheral edge portion of the diaphragm;
a piston configured to move upward and downward integrally with the stem; and
drive means configured to move the piston upward and downward,
wherein a gap between an upper surface of an outer peripheral edge portion of the diaphragm holder and a lower surface of an inner peripheral edge portion of the holder adapter is set as a first gap, and an upward movable amount of the diaphragm holder is set by the first gap, and
wherein a second gap for setting a downward movable amount of the stem is a space bound by a lower surface of the flange portion provided at the lower end portion of the stem and an upper surface of the holder adapter and the second gap is set to a predetermined value for fluid controller operation.

2. The fluid controller according to claim 1, wherein the stem and the piston are integrally formed by being engaged with each other, so that the upward movable amount of the stem set by adjusting an amount of engagement between the stem and the piston may be set to be smaller than the upward movable amount of the stem set by the first gap.

3. The fluid controller of according to claim 1, wherein an annular upper protruding portion is provided on a radially outer peripheral edge portion on an upper surface of the flange portion of the stem.

4. The fluid controller of according to claim 3, wherein the annular upper protruding portion has a square cross-section.

5. The fluid controller of according to claim 3, wherein a third gap is a space bound by an upper surface of the annular upper protruding portion of the flange portion of the stem and an upper surface of a depression in an inner surface of the bonnet.

6. The fluid controller of according to claim 5, wherein the third gap may be an upper limit value of an allowable upward movable amount of the stem during opening and closing operation.

7. The fluid controller of according to claim 3, wherein the flange portion at the lower end portion of the stem has a U-shaped cross-section.

8. The fluid controller of according to claim 5, wherein the first gap and the third gap are defined to have a relationship such that the third gap is greater than the first gap,
   wherein the first gap is set to be the upper limit value of the upward movable amount of the stem during opening and closing operation.

9. The fluid controller of according to claim 3, wherein the stem has a contacting relationship with the bonnet at the lower end portion of the stem.

\* \* \* \* \*